(12) United States Patent
Matheis et al.

(10) Patent No.: US 10,578,637 B2
(45) Date of Patent: Mar. 3, 2020

(54) INTEGRATION OF LOW ICE ADHESION SURFACE COATINGS WITH AIR DATA PROBES

(71) Applicant: Rosemount Aerospace Inc., Burnsville, MN (US)

(72) Inventors: Brian Daniel Matheis, Lakeville, MN (US); Matthew Anderson, Burnsville, MN (US); Greg Allen Seidel, Farmington, MN (US); Paul Llamas, Minnetrista, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/009,989

(22) Filed: Jun. 15, 2018

(65) Prior Publication Data
US 2019/0383848 A1    Dec. 19, 2019

(51) Int. Cl.
*G01P 5/165*    (2006.01)
*B64D 15/00*    (2006.01)

(52) U.S. Cl.
CPC .................................. *G01P 5/165* (2013.01)

(58) Field of Classification Search
CPC ............................... G01P 5/165; B64D 15/00
See application file for complete search history.

(56) References Cited

U.S. PATENT DOCUMENTS

| | | | |
|---|---|---|---|
| 7,992,823 B2 | 8/2011 | Rainous et al. | |
| 9,199,741 B2 | 12/2015 | Sapper et al. | |
| 9,802,711 B2 | 10/2017 | Bruce et al. | |
| 9,932,482 B2 | 4/2018 | Aizenberg et al. | |
| 2009/0272095 A1 | 11/2009 | Rainous et al. | |
| 2015/0299503 A1 | 10/2015 | Carter | |
| 2016/0059967 A1* | 3/2016 | Tjeenk Willink | F01D 5/288 427/230 |
| 2016/0377487 A1 | 12/2016 | Cheung et al. | |
| 2019/0144122 A1* | 5/2019 | Loth | C09D 5/00 |

FOREIGN PATENT DOCUMENTS

| | | |
|---|---|---|
| WO | WO2004078873 A2 | 9/2004 |
| WO | WO2004078873 A3 | 9/2004 |
| WO | WO2017162862 A1 | 9/2017 |

OTHER PUBLICATIONS

Harco, "Pitot Probes," p. 1.
Extended European Search Report for European Patent Application No. 19180623.1, dated Aug. 19, 2019, 9 pages.

* cited by examiner

*Primary Examiner* — Jewel V Dowtin
(74) *Attorney, Agent, or Firm* — Kinney & Lange, P.A.

(57) ABSTRACT

An air data probe includes a body, a mount adjacent to the body, a primary low ice adhesion surface coating on a primary impact region of the air data probe, the primary impact region being positioned for direct impact with water drops, and a secondary low ice adhesion surface coating on a secondary impact region of the air data probe, the secondary impact region being positioned for indirect contact by water drops. The primary low ice adhesion surface coating has a different composition than the secondary low ice adhesion surface coating.

20 Claims, 3 Drawing Sheets

INTEGRATION OF LOW ICE ADHESION SURFACE COATINGS WITH AIR DATA PROBES

BACKGROUND

The present disclosure relates generally to air data probes, and in particular, to low ice adhesion surface coatings on air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Air data probes may be, for example, pitot probes, total air temperature probes, or angle of attack sensors.

Air data probes are mounted to an exterior of an aircraft in order to gain exposure to external airflow. External airflow may contain water or ice particles that can collect and freeze onto the air data probe. Ice growth on an air data probe can interfere with the accuracy of the air data probe output.

SUMMARY

An air data probe includes a body, a mount adjacent to the body, a primary low ice adhesion surface coating on a primary impact region of the air data probe, the primary impact region being positioned for direct impact with water drops, and a secondary low ice adhesion surface coating on a secondary impact region of the air data probe, the secondary impact region being positioned for indirect contact by water drops. The primary low ice adhesion surface coating has a different composition than the secondary low ice adhesion surface coating.

A method of avoiding undesirable ice buildup on an air data probe includes shedding ice and/or water from a primary impact region of the air data probe with a primary low ice adhesion surface coating and shedding ice and/or water from a secondary impact region of the air data probe with a secondary low ice adhesion surface coating.

DETAILED DESCRIPTION

In general, the present disclosure describes primary low ice adhesion surface (LIAS) coatings, including slippery liquid infused porous surfaces (SLIPS), that are applied on primary impact regions of air data probes, and secondary LIAS coatings, including hydrophobic or super-hydrophobic coatings and silicone and polymer based coatings, that are applied on secondary impact regions of air data probes. Low ice adhesion surface coatings are coatings that cause ice to adhere poorly to a surface such that ice sheds quickly from that surface. Strategic placement of the LIAS coatings, or ice-phobic coatings, is cost-effective and increases protection of the air data probes from icing conditions while requiring little or no electrical heat.

Figure 1:
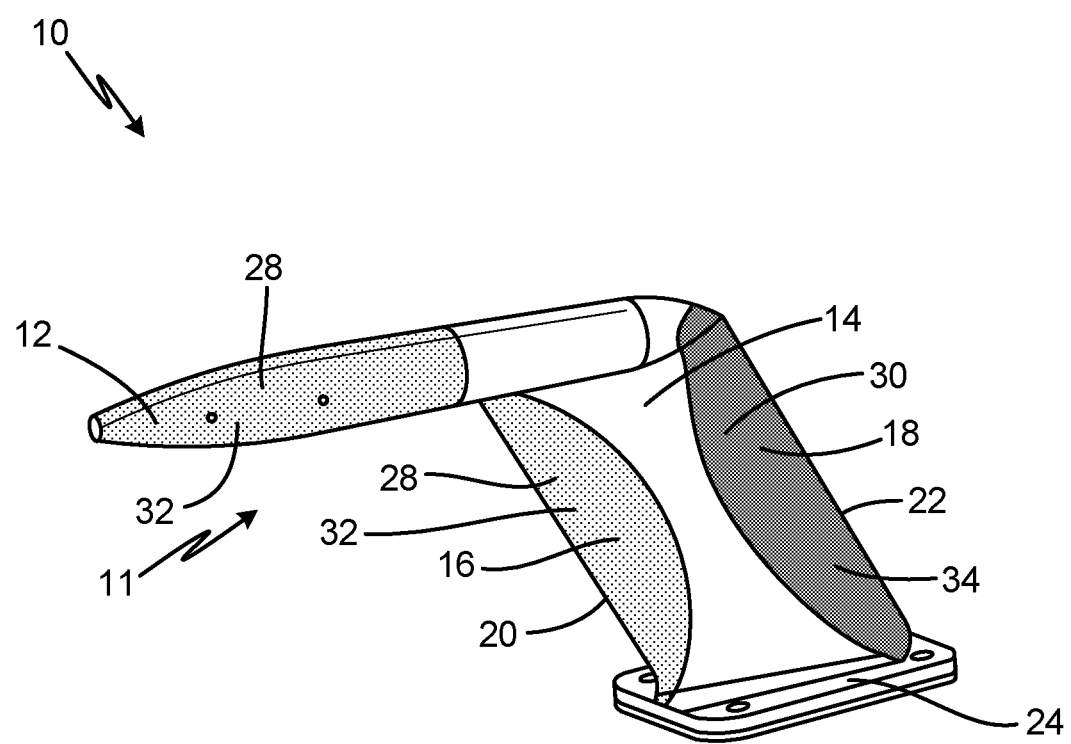
FIG. 1 is a perspective view of a pitot probe showing a primary low ice adhesion surface coating and a secondary low ice adhesion surface coating.

FIG. 1 is a perspective view of pitot probe 10, which includes body 11 formed by probe head 12 and strut 14 (which includes forward portion 16, aft portion 18, leading edge 20, and trailing edge 22), mounting flange 24, primary impact region 28, secondary impact region 30, primary low ice adhesion surface coating 32, and secondary low ice adhesion surface coating 34. Primary low ice adhesion surface coating 32 is located on primary impact region 28, and secondary low ice adhesion surface coating 34 is located on secondary impact region 30.

Pitot probe 10 is an air data probe. Pitot probe 10 may be a pitot-static probe or any other suitable air data probe. Probe head 12 is the sensing head of pitot probe 10. Probe head 12 is a forward portion of pitot probe 10. Probe head 12 has one or more ports positioned in probe head 12. Internal components of pitot probe 10 are located within probe head 12. Probe head 12 is connected to a first end of strut 14. Probe head 12 and strut 14 make up body 11 of pitot probe 10. Strut 14 is blade-shaped. Internal components of pitot probe 10 are located within strut 14. Strut 14 has forward portion 16 at an upstream side of strut 14 and aft portion 18 at a downstream side of strut 14. Aft portion 18 of strut 14 is an aft portion of pitot probe 10. Leading edge 20 of strut 14 is at forward portion 16, and trailing edge 22 of strut 14 is at aft portion 18. Leading edge 20 is opposite trailing edge 22. Strut 14 is adjacent mounting flange 24. A second end of strut 14 is connected to mounting flange 24. Mounting flange 24 makes up a mount of pitot probe 10. Mounting flange 24 is connectable to an aircraft.

Primary impact region 28 is a forward portion of pitot probe 10. Specifically, probe head 12 and forward portion 16 of strut 14 define primary impact region 28. Primary impact region 28 is a region of pitot probe 10 positioned for direct impact, or direct impingement, with water drops. Water drops impact primary impact region 28 via direct trajectory path to a surface of primary impact region 28 and with significant velocity. Primary impact region 28 is heated. In order for pitot probe 10 to function properly, primary impact region 28 may not accumulate ice.

Secondary impact region 30 is an aft portion of pitot probe 10. Specifically, aft portion 18 of strut 14, including trailing edge 22, defines secondary impact region 30. Secondary impact region 30 is a region of pitot probe 10 positioned for indirect contact by water drops. Water drops impact secondary impact region 30 either through less direct, or secondary, impingement, water run-back, turbulent diffusion, or other means. Secondary impact region 30 may or may not be heated. A small amount of ice may accumulate on secondary impact region 30 without adversely affecting the function of pitot probe 10.

Primary low ice adhesion surface coating 32 is located on primary impact region 28. Primary low ice adhesion surface coating 32 is a robust low ice adhesion surface coating. Primary low ice adhesion surface coating 32 may be slippery liquid infused porous surfaces (SLIPS) or any other suitable coating capable of withstanding primary impact region 28. SLIPS comprise a liquid infused within a porous surface, which may be achieved via microscale structures in the surface of primary impact region 28.

Secondary low ice adhesion surface coating 34 is located on secondary impact region 30. Secondary low ice adhesion surface coating 34 is a high-performance low ice adhesion surface coating having a different composition than primary low ice adhesion surface coating 32. Secondary low ice adhesion surface coating 34 may be a hydrophobic coating, a super-hydrophobic coating, a silicone-based coating, or a polymer-based coating. Hydrophobic and super-hydrophobic coatings may be achieved via machined microscale structures in the surface of secondary impact region 30. Hydrophobic and super-hydrophobic coatings increase the contact angle of a water drop relative to the surface of secondary impact region 30. The degree of hydrophobicity depends on the ability of water to wet between the microscale surface structures, which is inversely related to the contact angle. Hydrophobic coatings may also be achieved using Carbon Nano Tubes (CNT) that are applied to a surface of secondary impact region 30 to create microscale structures on the surface of secondary impact region 30. Additionally, heat (from a heat source within pitot probe 10) can be applied to Carbon Nano Tubes to heat the Carbon Nano Tubes. For example, current can be applied across the surface of Carbon Nano Tubes. Silicone or polymer-based coatings are less robust coatings that have a low shear modulus. Silicone or polymer-based coatings of secondary impact region 30 can be tailored to produce differing levels of shear modulus based on the desired level of ice adhesion and robustness. Silicone or polymer-based coatings can be passive or active coatings.

Pitot probe 10 is installed on an aircraft. Pitot probe 10 may be mounted to a fuselage of the aircraft via mounting flange 24 and fasteners, such as screws or bolts. Strut 14 holds probe head 12 away from the fuselage of the aircraft to expose probe head 12 to external airflow. Probe head 12 takes in air from surrounding external airflow and communicates air pressures pneumatically through internal components and passages of probe head 12 and strut 14. Pressure measurements are communicated to a flight computer and can be used to generate air data parameters related to the aircraft flight condition.

The external airflow may contain water or ice particles that can collect on freeze on pitot probe 10 upon impact. Water impacting pitot probe 10 may cause ice accumulation on pitot probe 10.

Primary low ice adhesion surface coating 32 prevents ice from forming in primary impact region 28 of pitot probe 10. For example, SLIPS cause water, and potentially ice particles, to quickly shed off primary impact region 28. Water and ice do not interact with the liquid, such as oil, infused in the porous surface created by the microscale structures of primary low ice adhesion surface coating 32. Along with the shedding ice and water, some of the liquid infused within the porous surface is lost during the ice shedding process. As such, the microscale structure is not sacrificed with successive ice shedding cycles. The infused liquid may also be lost due to external forces. As such, primary low ice adhesion surface coating 32 may be periodically resupplied with infused liquid. SLIPS are compatible with primary impact region 28 because the porous surfaces are protected by the infused liquid.

Secondary low ice adhesion surface coating 34 decreases the amount of ice that forms in secondary impact region 30 of pitot probe 10, preventing significant icing from occurring in secondary impact region 30. Secondary low ice adhesion surface coating 34 prevents ice from growing into large ice shapes that can disrupt air data probe measurement by limiting the maximum size of ice that grows before shedding from secondary impact region 30. Secondary low ice adhesion surface coating 34 is effective in secondary impact region 30, where a small amount of ice may accumulate. Hydrophobic or super-hydrophobic coatings, including passive (non-heated) Carbon Nano Tubes, are compatible because impacting water in secondary impact region 30 tends toward the Cassie-Baxter state (in which water drops sit on top of surface structures). The water drops in secondary impact region 30 have a decreased ability to wet between the microscale surface structures, the increased contact angle resulting in lower adhesion strength. As such, water drops sit on top of the microscale structures of secondary low ice adhesion surface coating 34. As a result, the water, which may accumulate as a small ice formation, more easily sheds, or is stripped away, from the surface of secondary impact region 30 by aerodynamic forces before accumulating into a large ice growth. Additionally, super-hydrophobic coatings may cause delayed nucleation of ice. Moreover, Carbon Nano Tubes can be heated as an active method that encourages shedding of water and also prevents or melts any small ice formations. Further, a passive silicone or polymer-based secondary low ice adhesion surface coating 34 takes advantage of the natural reduction in ice adhesion due to a lower shear modulus as ice adhesion strength of a surface is proportional to the shear modulus of the substrate. As such, ice sheds quickly from secondary impact region 30. An active silicone or polymer-based secondary low ice adhesion surface coating 34 involves sending a mechanical pulse down secondary low ice adhesion surface coating 34 to encourage ice to shed. Though silicone or polymer-based coatings are less robust, erosion is less likely in secondary impact region 30, making silicone and polymer-based coatings compatible with secondary impact region 30.

On the other hand, secondary low ice adhesion surface coating 34 is less effective in primary impact region 28. Hydrophobic or super hydrophobic coatings, for example, are less effective in primary impact region 28 because impacting water tends toward the Wenzel state (in which water drops move between surface structures), due to the high normal velocities of the water at impact in primary impact region 28. Upon impact, water drops in primary impact region 28 impale themselves on the microscale structures of a hydrophobic or super-hydrophobic secondary low ice adhesion surface coating 34, negating the low ice adhesion effect of the microstructures. Primary low ice adhesion surface coatings 32, such as SLIPS, are conducive to primary impact region 28 by avoiding the transition between the Wenzel and Cassie-Baxter states. Carbon Nano Tubes are also less robust and may not be able to withstand impacting water in primary impact region 28. Likewise, silicone or polymer-based coatings, for example, are less effective in primary impact region 28. Because silicone or polymer-based coatings are less robust, silicone or polymer-based coatings are more easily removed from primary impact region 28.

Air data probes, such as pitot probe 10, are required to maintain performance in severe and extensive icing environments. Air data probes, such as pitot probe 10, are exposed to increased levels of icing. Additionally, greater portions of air data probes, such as pitot probe 10, are exposed to icing. Large ice growths on air data probes, such as pitot probe 10, can interfere with the accuracy of the air data probe output.

Low ice adhesion surface (LIAS) coatings, or ice-phobic coatings, reduce or eliminate the amount of heat required by air data probes. Because secondary impact region 30 is permitted some amount of ice growth and ice shedding, use of secondary low ice adhesion surface coating 34 eliminates the requirement of electrical heat in secondary impact region 30 of pitot probe 10. Because no ice growth is tolerated in primary impact region 28, primary low ice adhesion surface coating 32 decreases the amount of heat required to prevent ice from forming in primary impact region 28 of pitot probe 10. As a result of the more passive primary low ice adhesion surface coating 32 and secondary low ice adhesion surface coating 34 operating with no or little electrical heat, pitot probe 10 operates with lower power requirements and has increased reliability. Additionally, pitot probe 10 requiring less heat results in greater fuel efficiency. Further, along with water and ice particles, primary low ice adhesion surface coating 32 and secondary low ice adhesion surface coating 34 will shed chemicals from pitot probe 10, decreasing corrosion and prolonging the use of pitot probe 10.

Primary low ice adhesion surface coating 32 offers improved performance of pitot probe 10 in icing conditions. Primary low ice adhesion surface coating 32 is effective in primary impact region 28. Because SLIPS avoid the issue of transition between the Wenzel and Cassie-Baxter states and prevent micro-structure from being sacrificed, SLIPS are more durable and suitable for primary impact region 28.

Secondary low ice adhesion surface coating 34 is less effective in primary impact region 28. For example, water impacting a hydrophobic coating in primary impact region 28 will tend toward the Wenzel state and result in ice formations, which will take microscale structure along when shedding from primary impact region 28, reducing ice adhesion performance in the next de-icing cycle. Rather, secondary low ice adhesion surface coating 34 in secondary impact region 30 contributes to improved performance of pitot probe 10 in icing conditions. Secondary low ice adhesion surface coating 34 prevents significant ice accumulation in secondary impact region 30 without requiring the use of heat. Secondary low ice adhesion surface coating 34 is also protected from erosion in secondary impact region 30.

Primary low ice adhesion surface coating 32 and secondary low ice adhesion surface coating 34 together protect pitot probe 10 from extreme icing conditions. Primary low ice adhesion surface coating 32 operates differently than secondary low ice adhesion surface coating 34. As such, primary low ice adhesion surface coating 32 and secondary low ice adhesion surface coating 34 are applied to different regions of pitot probe 10—primary impact region 28 and secondary impact region 30—that have different characteristics to maximize effectiveness in icing conditions. For example, more robust primary low ice adhesion surface coating 32, such as SLIPS, is applied to more severe primary impact region 28, and less robust secondary low ice adhesion surface coating 34, such as Carbon Nano Tubes or silicone or polymer-based coatings, is applied to less severe secondary impact region 30. Additionally, proper strategic placement of primary low ice adhesion surface coating 32 and secondary low ice adhesion surface coating 34 is more cost-effective and improves maintenance.

Figure 2:
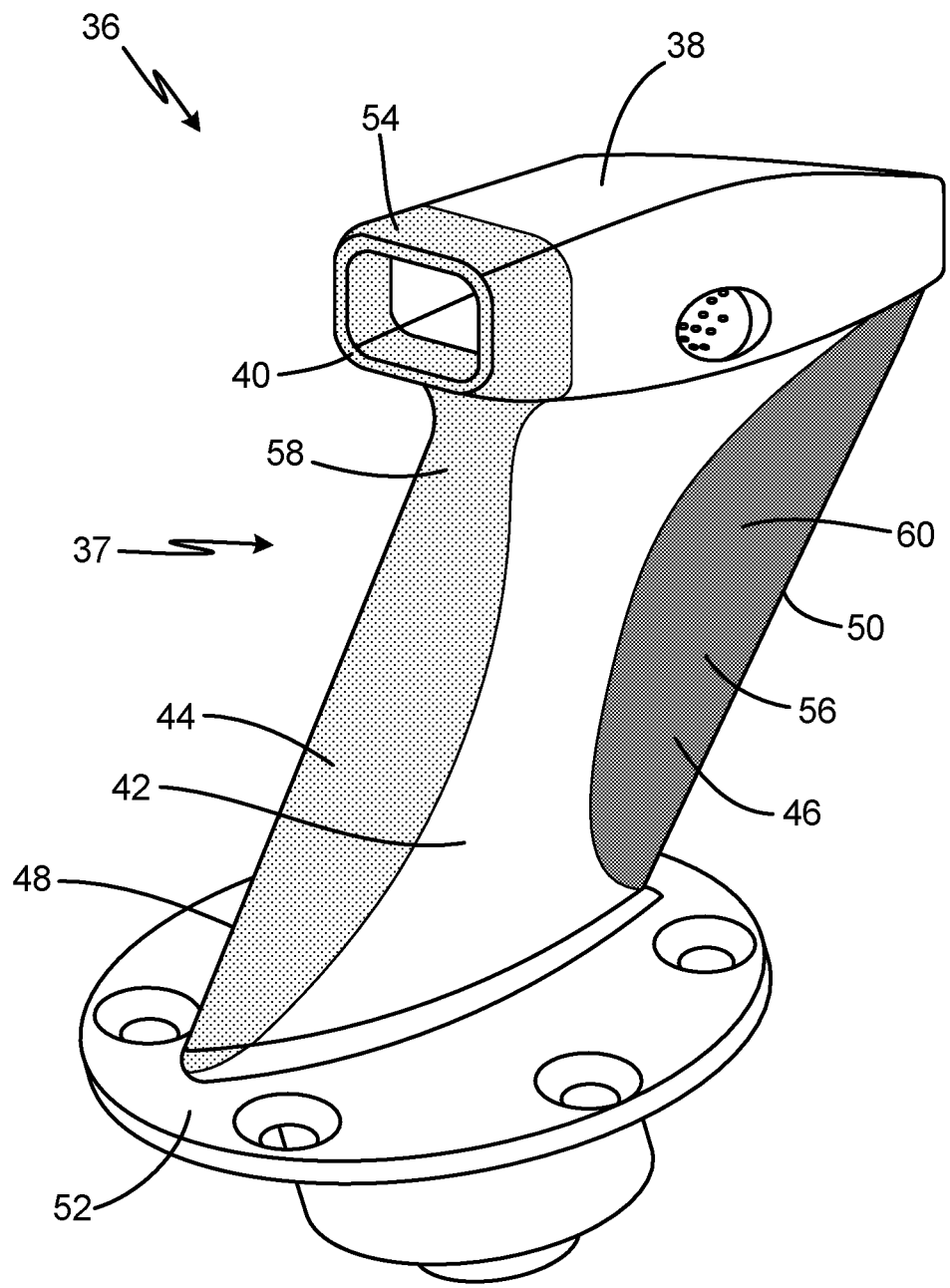
FIG. 2 is a perspective view of a total air temperature probe showing a primary low ice adhesion surface coating and a secondary low ice adhesion surface coating.

FIG. 2 is a perspective view of total air temperature probe 36, which includes body 37 formed by head 38 (which includes inlet scoop 40) and strut 42 (which includes forward portion 44, aft portion 46, leading edge 48, and trailing edge 50), mounting flange 52, primary impact region 54, secondary impact region 56, primary low ice adhesion surface coating 58, and secondary low ice adhesion surface coating 60. Primary low ice adhesion surface coating 58 is located on primary impact region 54, and secondary low ice adhesion surface coating 60 is located on secondary impact region 56.

Total air temperature probe 36 is an air data probe. Head 38, having inlet scoop 40, is connected to a first end of strut 42. Inlet scoop 40 is a forward portion of total air temperature probe 36. Inlet scoop 40 is an opening in a forward, or upstream, end of head 38. Head 38 and strut 42 make up body 37 of total air temperature probe 36. Strut 42 has forward portion 44 at an upstream side of strut 42 and aft portion 46 at a downstream side of strut 42. Aft portion 46 of strut 42 is an aft portion of total air temperature probe 36. Leading edge 48 of strut 42 is at forward portion 44, and trailing edge 50 of strut 42 is at aft portion 46. Leading edge 48 is opposite trailing edge 50. Strut 42 is adjacent mounting flange 52. A second end of strut 42 is connected to mounting flange 52. Mounting flange 52 makes up a mount of total air temperature probe 36. Mounting flange 52 is connectable to an aircraft.

Primary impact region 54 is a forward portion of total air temperature probe 36. Specifically, inlet scoop 40 defines primary impact region 54 and forward portion 44 of strut 42, including leading edge 48. Primary impact region 54 is a region of total air temperature probe 36 positioned for direct impact, or direct impingement, with water drops. Water drops impact primary impact region 54 via direct trajectory path to a surface of primary impact region 54 and with significant velocity. Primary impact region 54 is heated. In order for total air temperature probe 36 to function properly, primary impact region 54 may not accumulate ice.

Secondary impact region 56 is an aft portion of total air temperature probe 36. Specifically, aft portion 46 of strut 42, including trailing edge 50, defines secondary impact region 56. Secondary impact region 56 is a region of total air temperature probe 36 positioned for indirect contact by water drops. Water drops impact secondary impact region 56 either through less direct, or secondary, impingement, water run-back, turbulent diffusion, or other means. Secondary impact region 56 may or may not be heated. A small amount of ice may accumulate on secondary impact region 56 without adversely affecting the function of total air temperature probe 36.

Primary low ice adhesion surface coating 58 is located on primary impact region 54. Primary low ice adhesion surface coating 58 is a robust low ice adhesion surface coating. Primary low ice adhesion surface coating 58 may be slippery liquid infused porous surfaces (SLIPS) or any other suitable coating capable of withstanding primary impact region 54. SLIPS comprise a liquid infused within a porous surface, which may be achieved via microscale structures in the surface of primary impact region 54.

Secondary low ice adhesion surface coating 60 is located on secondary impact region 56. Secondary low ice adhesion surface coating 60 is a high-performance low ice adhesion surface coating having a different composition than primary low ice adhesion surface coating 58. Secondary low ice adhesion surface coating 60 may be a hydrophobic coating, a super-hydrophobic coating, a silicone-based coating, or a polymer-based coating. Hydrophobic and super-hydrophobic coatings may be achieved via machined microscale structures in the surface of secondary impact region 56. Hydrophobic and super-hydrophobic coatings increase the contact angle of a water drop relative to the surface of secondary impact region 56. The degree of hydrophobicity depends on the ability of water to wet between the microscale surface structures, which is inversely related to the contact angle. Hydrophobic coatings may also be achieved using Carbon Nano Tubes (CNT) that are applied to a surface of secondary impact region 56 to create microscale structures on the surface of secondary impact region 56. Additionally, heat (from a heat source within total air temperature probe 36) can be applied to Carbon Nano Tubes to heat the Carbon Nano Tubes. For example, current can be applied across the surface of Carbon Nano Tubes. Silicone or polymer-based coatings are less robust coatings that have a low shear modulus. Silicone or polymer-based coatings of secondary impact region 56 can be tailored to produce differing levels of shear modulus based on the desired level of ice adhesion and robustness. Silicone or polymer-based coatings can be passive or active coatings.

Total air temperature probe 36 is installed on an aircraft. Total air temperature probe 36 may be mounted to a fuselage of the aircraft via mounting flange 52 and fasteners, such as screws or bolts. Strut 42 holds head 38 away from the fuselage of the aircraft to expose head 38 to external airflow. Air flows into total air temperature probe 36 through inlet scoop 40 of head 38. Air flows into an interior passage within strut 14 of total air temperature probe 36, where sensing elements measure the total air temperature of the air. Total air temperature measurements of the air are communicated to a flight computer. Such measurements can be used to generate air data parameters related to the aircraft flight condition.

The external airflow may contain water or ice particles that can collect on freeze on total air temperature probe 36 upon impact. Water impacting total air temperature probe 36 may cause ice accumulation on total air temperature probe 36.

Primary low ice adhesion surface coating 58 prevents ice from forming in primary impact region 54 of total air temperature probe 36. For example, SLIPS cause water, and potentially ice particles, to quickly shed off primary impact region 54. Water and ice do not interact with the liquid, such as oil, infused in the porous surface created by the microscale structures of primary low ice adhesion surface coating 58. Along with the shedding ice and water, some of the liquid infused within the porous surface is lost during the ice shedding process. As such, the microscale structure is not sacrificed with successive ice shedding cycles. The infused liquid may also be lost due to external forces. As such, primary low ice adhesion surface coating 58 may be periodically resupplied with infused liquid. SLIPS are compatible with primary impact region 54 because the porous surfaces are protected by the infused liquid.

Secondary low ice adhesion surface coating 60 decreases the amount of ice that forms in secondary impact region 56 of total air temperature probe 36, preventing significant icing from occurring in secondary impact region 56. Secondary low ice adhesion surface coating 60 prevents ice from growing into large ice shapes that can disrupt air data probe measurement by limiting the maximum size of ice that grows before shedding from secondary impact region 56. Secondary low ice adhesion surface coating 60 is effective in secondary impact region 56, where a small amount of ice may accumulate. Hydrophobic or super-hydrophobic coatings, including passive (non-heated) Carbon Nano Tubes, are compatible because impacting water in secondary impact region 56 tends toward the Cassie-Baxter state. The water drops in secondary impact region 56 have a decreased ability to wet between the microscale surface structures, the increased contact angle resulting in lower adhesion strength. As such, water drops sit on top of the microscale structures of secondary low ice adhesion surface coating 60. As a result, the water, which may accumulate as a small ice formation, more easily sheds, or is stripped away, from the surface of secondary impact region 56 by aerodynamic forces before accumulating into a large ice growth. Additionally, super-hydrophobic coatings may cause delayed nucleation of ice. Moreover, Carbon Nano Tubes can be heated as an active method that encourages shedding of water and also prevents or melts any small ice formations. Further, a passive silicone or polymer-based secondary low ice adhesion surface coating 60 takes advantage of the natural reduction in ice adhesion due to a lower shear modulus as ice adhesion strength of a surface is proportional to the shear modulus of the substrate. As such, ice sheds quickly from secondary impact region 56. An active silicone or polymer-based secondary low ice adhesion surface coating 60 involves sending a mechanical pulse down secondary low ice adhesion surface coating 60 to encourage ice to shed. Though silicone or polymer-based coatings are less robust, erosion is less likely in secondary impact region 56, making silicone and polymer-based coatings compatible with secondary impact region 56.

On the other hand, secondary low ice adhesion surface coating 60 is less effective in primary impact region 54. Hydrophobic or super hydrophobic coatings, for example, are less effective in primary impact region 54 because impacting water tends toward the Wenzel state due to the high normal velocities of the water at impact in primary impact region 54. Upon impact, water drops in primary impact region 54 impale themselves on the microscale structures of a hydrophobic or super-hydrophobic secondary low ice adhesion surface coating 60, negating the low ice adhesion effect of the microstructures. Primary low ice adhesion surface coatings 58, such as SLIPS, are conducive to primary impact region 54 by avoiding the transition between the Wenzel and Cassie-Baxter states. Carbon Nano Tubes are also less robust and may not be able to withstand impacting water in primary impact region 28. Likewise, silicone or polymer-based coatings, for example, are less effective in primary impact region 54. Because silicone or polymer-based coatings are less robust, silicone or polymer-based coatings are more easily removed from primary impact region 54.

Air data probes, such as total air temperature probe 36, are required to maintain performance in severe and extensive icing environments. Air data probes, such as total air temperature probe 36, are exposed to increased levels of icing. Additionally, greater portions of air data probes, such as total air temperature probe 36, are exposed to icing. Large ice growths on air data probes, such as total air temperature probe 36, can interfere with the accuracy of the air data probe output.

Low ice adhesion surface (LIAS) coatings, or ice-phobic coatings, reduce or eliminate the amount of heat required by air data probes. Because secondary impact region 56 is permitted some amount of ice growth and ice shedding, use of secondary low ice adhesion surface coating 60 eliminates the requirement of electrical heat in secondary impact region 56 of total air temperature probe 36. Because no ice growth is tolerated in primary impact region 54, primary low ice adhesion surface coating 58 decreases the amount of heat required to prevent ice from forming in primary impact region 54 of total air temperature probe 36. As a result of the more passive primary low ice adhesion surface coating 58 and secondary low ice adhesion surface coating 60 operating with no or little electrical heat, total air temperature probe 36 operates with lower power requirements and has increased reliability. Additionally, total air temperature probe 36 requiring less heat results in greater fuel efficiency. Further, along with water and ice particles, primary low ice adhesion surface coating 58 and secondary low ice adhesion surface coating 60 will shed chemicals from total air temperature probe 36, decreasing corrosion and prolonging the use of total air temperature probe 36.

Primary low ice adhesion surface coating 58 offers improved performance of total air temperature probe 36 in icing conditions. Primary low ice adhesion surface coating 58 is effective in primary impact region 54. Because SLIPS avoid the issue of transition between the Wenzel and Cassie-Baxter states and prevent micro-structure from being sacrificed, SLIPS are more durable and suitable for primary impact region 54. Secondary low ice adhesion surface coating 60 is less effective in primary impact region 54. For example, water impacting a hydrophobic coating in primary impact region 54 will tend toward the Wenzel state and result in ice formations, which will take microscale structure along when shedding from primary impact region 54, reducing ice adhesion performance in the next de-icing cycle. Rather, secondary low ice adhesion surface coating 60 in secondary impact region 56 contributes to improved performance of total air temperature probe 36 in icing conditions. Secondary low ice adhesion surface coating 60 prevents significant ice accumulation in secondary impact region 56 without requiring the use of heat. Secondary low ice adhesion surface coating 60 is also protected from erosion in secondary impact region 56.

Primary low ice adhesion surface coating 58 and secondary low ice adhesion surface coating 60 together protect total air temperature probe 36 from extreme icing conditions. Primary low ice adhesion surface coating 58 operates differently than secondary low ice adhesion surface coating 60. As such, primary low ice adhesion surface coating 58 and secondary low ice adhesion surface coating 60 are applied to different regions of total air temperature probe 36—primary impact region 54 and secondary impact region 56—that have different characteristics to maximize effectiveness in icing conditions. For example, more robust primary low ice adhesion surface coating 58, such as SLIPS, is applied to more severe primary impact region 54, and less robust secondary low ice adhesion surface coating 60, such as Carbon Nano Tubes or silicone or polymer-based coatings, is applied to less severe secondary impact region 56. Additionally, proper strategic placement of primary low ice adhesion surface coating 58 and secondary low ice adhesion surface coating 60 is more cost-effective and improves maintenance.

Figure 3:
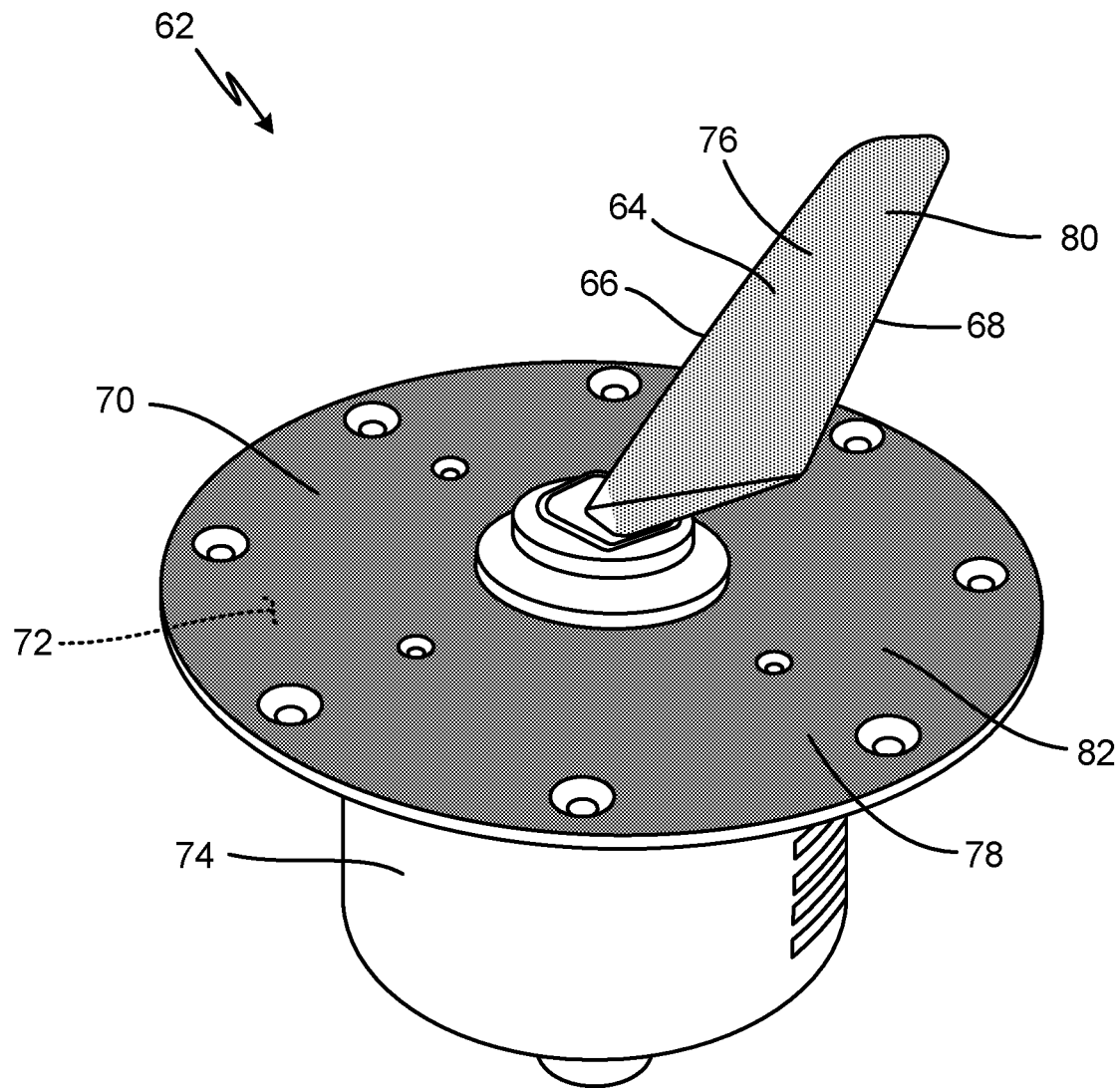
FIG. 3 is a perspective view of an angle of attack sensor showing a primary low ice adhesion surface coating and a secondary low ice adhesion surface coating.

FIG. 3 is a perspective view of angle of attack sensor 62, which includes vane 64 (which includes leading edge 66 and trailing edge 68), faceplate 70 (which includes exterior surface 72), housing 74, primary impact region 76, secondary impact region 78, primary low ice adhesion surface coating 80, and secondary low ice adhesion surface coating 82. Primary low ice adhesion surface coating 80 is located on primary impact region 76, and secondary low ice adhesion surface coating 82 is located on secondary impact region 78.

Angle of attack sensor 62 is an air data probe. Vane 64 makes up a body of angle of attack sensor 62. Vane 64 has leading edge 66 at a forward, or upstream, portion of vane 64 and trailing edge 68 at an aft, or downstream, portion of vane 64. Leading edge 66 is opposite trailing edge 68. Vane 64 is adjacent faceplate 70. Specifically, exterior surface 72 of faceplate 70 is adjacent vane 64. Faceplate 70 makes up a mount of angle of attack sensor 62. Faceplate 70 is connectable to an aircraft. Exterior surface 72 is at a first side of faceplate 70 that may be exposed to external airflow. A second side of faceplate 70 is connected to housing 74. Faceplate 70 is positioned on housing 74. Internal components of angle of attack sensor 62 are located within housing 74.

Vane 64 defines primary impact region 76. Leading edge 66 of vane 64 may particularly define primary impact region 76. Primary impact region 76 is a region of angle of attack sensor 62 positioned for direct impact, or direct impingement, with water drops. Water drops impact primary impact region 76 via direct trajectory path to a surface of primary impact region 76 and with significant velocity. Primary impact region 76 is heated. In order for angle of attack sensor 62 to function properly, primary impact region 76 may not accumulate ice.

Faceplate 70 defines secondary impact region 78. Specifically, exterior surface 72 of faceplate 70 defines secondary impact region 30. Secondary impact region 78 is a region of angle of attack sensor 62 positioned for indirect contact by water drops. Water drops impact secondary impact region 78 either through less direct, or secondary, impingement, water run-back, turbulent diffusion, or other means. Secondary impact region 78 may or may not be heated. A small amount of ice may accumulate on secondary impact region 78 without adversely affecting the function of angle of attack sensor 62.

Primary low ice adhesion surface coating 80 is located on primary impact region 76. Primary low ice adhesion surface coating 80 is a robust low ice adhesion surface coating. Primary low ice adhesion surface coating 80 may be slippery liquid infused porous surfaces (SLIPS) or any other suitable coating capable of withstanding primary impact region 76. SLIPS comprise a liquid infused within a porous surface, which may be achieved via microscale structures in the surface of primary impact region 76.

Secondary low ice adhesion surface coating 82 is located on secondary impact region 78. Secondary low ice adhesion surface coating 82 is a high-performance low ice adhesion surface coating having a different composition than primary low ice adhesion surface coating 80. Secondary low ice adhesion surface coating 82 may be a hydrophobic coating, a super-hydrophobic coating, a silicone-based coating, or a polymer-based coating. Hydrophobic and super-hydrophobic coatings may be achieved via machined microscale structures in the surface of secondary impact region 78. Hydrophobic and super-hydrophobic coatings increase the contact angle of a water drop relative to the surface of secondary impact region 78. The degree of hydrophobicity depends on the ability of water to wet between the microscale surface structures, which is inversely related to the contact angle. Hydrophobic coatings may also be achieved using Carbon Nano Tubes (CNT) that are applied to a surface of secondary impact region 78 to create microscale structures on the surface of secondary impact region 78. Additionally, heat (from a heat source within angle of attack sensor 62) can be applied to Carbon Nano Tubes to heat the Carbon Nano Tubes. For example, current can be applied across the surface of Carbon Nano Tubes. Silicone or polymer-based coatings are less robust coatings that have a low shear modulus. Silicone or polymer-based coatings of secondary impact region 78 can be tailored to produce differing levels of shear modulus based on the desired level of ice adhesion and robustness. Silicone or polymer-based coatings can be passive or active coatings.

Angle of attack sensor 62 is installed on an aircraft. Angle of attack sensor 62 may be mounted to a fuselage of the aircraft via faceplate 70 and fasteners, such as screws or bolts. Vane 64 extends outside an exterior of the aircraft and is exposed to external airflow, and housing 74 extends within an interior of the aircraft. External airflow causes vane 64 to rotate with respect to faceplate 70 via a series of bearings within angle of attack sensor 62. Vane 64 rotates based on the angle the aircraft is flying at relative to the external oncoming airflow. Vane 64 causes rotation of a vane base and vane shaft within housing 74. The vane shaft is coupled to a rotational sensor that measures the local angle of attack or angle of the airflow relative to the fixed aircraft structure. The measured angle of attack is communicated to a flight computer and can be used to generate air data parameters related to the aircraft flight condition.

The external airflow may contain water or ice particles that can collect on freeze on angle of attack sensor 62 upon impact. Water impacting angle of attack sensor 62 may cause ice accumulation on angle of attack sensor 62.

Primary low ice adhesion surface coating 80 prevents ice from forming in primary impact region 76 of angle of attack sensor 62. For example, SLIPS cause water, and potentially ice particles, to quickly shed off primary impact region 76. Water and ice do not interact with the liquid, such as oil, infused in the porous surface created by the microscale structures of primary low ice adhesion surface coating 80. Along with the shedding ice and water, some of the liquid infused within the porous surface is lost during the ice shedding process. As such, the microscale structure is not sacrificed with successive ice shedding cycles. The infused liquid may also be lost due to external forces. As such, primary low ice adhesion surface coating 80 may be periodically resupplied with infused liquid. SLIPS are compatible with primary impact region 76 because the porous surfaces are protected by the infused liquid.

Secondary low ice adhesion surface coating 82 decreases the amount of ice that forms in secondary impact region 78 of angle of attack sensor 62, preventing significant icing from occurring in secondary impact region 78. Secondary low ice adhesion surface coating 82 prevents ice from growing into large ice shapes that can disrupt air data probe measurement by limiting the maximum size of ice that grows before shedding from secondary impact region 78. Secondary low ice adhesion surface coating 82 is effective in secondary impact region 78, where a small amount of ice may accumulate. Hydrophobic or super-hydrophobic coatings, including passive (non-heated) Carbon Nano Tubes, are compatible because impacting water in secondary impact region 78 tends toward the Cassie-Baxter state. The water drops in secondary impact region 78 have a decreased ability to wet between the microscale surface structures, the increased contact angle resulting in lower adhesion strength. As such, water drops sit on top of the microscale structures of secondary low ice adhesion surface coating 82. As a result, the water, which may accumulate as a small ice formation, more easily sheds, or is stripped away, from the surface of secondary impact region 78 by aerodynamic forces before accumulating into a large ice growth. Additionally, super-hydrophobic coatings may cause delayed nucleation of ice. Moreover, Carbon Nano Tubes can be heated as an active method that encourages shedding of water and also prevents or melts any small ice formations. Further, a passive silicone or polymer-based secondary low ice adhesion surface coating 82 takes advantage of the natural reduction in ice adhesion due to a lower shear modulus as ice adhesion strength of a surface is proportional to the shear modulus of the substrate. As such, ice sheds quickly from secondary impact region 78. An active silicone or polymer-based secondary low ice adhesion surface coating 82 involves sending a mechanical pulse down secondary low ice adhesion surface coating 82 to encourage ice to shed. Though silicone or polymer-based coatings are less robust, erosion is less likely in secondary impact region 78, making silicone and polymer-based coatings compatible with secondary impact region 78.

On the other hand, secondary low ice adhesion surface coating 82 is less effective in primary impact region 76. Hydrophobic or super hydrophobic coatings, for example, are less effective in primary impact region 76 because impacting water tends toward the Wenzel state due to the high normal velocities of the water at impact in primary impact region 76. Upon impact, water drops in primary impact region 76 impale themselves on the microscale structures of a hydrophobic or super-hydrophobic secondary low ice adhesion surface coating 82, negating the low ice adhesion effect of the microstructures. Primary low ice adhesion surface coatings 80, such as SLIPS, are conducive to primary impact region 76 by avoiding the transition between the Wenzel and Cassie-Baxter states. Carbon Nano Tubes are also less robust and may not be able to withstand impacting water in primary impact region 28. Likewise, silicone or polymer-based coatings, for example, are less effective in primary impact region 76. Because silicone or polymer-based coatings are less robust, silicone or polymer-based coatings are more easily removed from primary impact region 76.

Air data probes, such as angle of attack sensor 62, are required to maintain performance in severe and extensive icing environments. Air data probes, such as angle of attack sensor 62, are exposed to increased levels of icing. Additionally, greater portions of air data probes, such as angle of attack sensor 62, are exposed to icing. Large ice growths on air data probes, such as angle of attack sensor 62, can interfere with the accuracy of the air data probe output.

Low ice adhesion surface (LIAS) coatings, or ice-phobic coatings, reduce or eliminate the amount of heat required by air data probes. Because secondary impact region 78 is permitted some amount of ice growth and ice shedding, use of secondary low ice adhesion surface coating 82 eliminates the requirement of electrical heat in secondary impact region 78 of angle of attack sensor 62. Because no ice growth is tolerated in primary impact region 76, primary low ice adhesion surface coating 80 decreases the amount of heat required to prevent ice from forming in primary impact region 76 of angle of attack sensor 62. As a result of the more passive primary low ice adhesion surface coating 80 and secondary low ice adhesion surface coating 82 operating with no or little electrical heat, angle of attack sensor 62 operates with lower power requirements and has increased reliability. Additionally, angle of attack sensor 62 requiring less heat results in greater fuel efficiency. Further, along with water and ice particles, primary low ice adhesion surface coating 80 and secondary low ice adhesion surface coating 82 will shed chemicals from angle of attack sensor 62, decreasing corrosion and prolonging the use of angle of attack sensor 62.

Primary low ice adhesion surface coating 80 offers improved performance of angle of attack sensor 62 in icing conditions. Primary low ice adhesion surface coating 80 is effective in primary impact region 76. Because SLIPS avoid the issue of transition between the Wenzel and Cassie-Baxter states and prevent micro-structure from being sacrificed, SLIPS are more durable and suitable for primary impact region 76. Secondary low ice adhesion surface coating 82 is less effective in primary impact region 76. For example, water impacting a hydrophobic coating in primary impact region 76 will tend toward the Wenzel state and result in ice formations, which will take microscale structure along when shedding from primary impact region 76, reducing ice adhesion performance in the next de-icing cycle. Rather, secondary low ice adhesion surface coating 82 in secondary impact region 78 contributes to improved performance of angle of attack sensor 62 in icing conditions. Secondary low ice adhesion surface coating 82 prevents significant ice accumulation in secondary impact region 78 without requiring the use of heat. Secondary low ice adhesion surface coating 82 is also protected from erosion in secondary impact region 78.

Primary low ice adhesion surface coating 80 and secondary low ice adhesion surface coating 82 together protect angle of attack sensor 62 from extreme icing conditions. Primary low ice adhesion surface coating 80 operates differently than secondary low ice adhesion surface coating 82. As such, primary low ice adhesion surface coating 80 and secondary low ice adhesion surface coating 82 are applied to different regions of angle of attack sensor 62—primary impact region 76 and secondary impact region 78—that have different characteristics to maximize effectiveness in icing conditions. For example, more robust primary low ice adhesion surface coating 80, such as SLIPS, is applied to more severe primary impact region 76, and less robust secondary low ice adhesion surface coating 82, such as Carbon Nano Tubes or silicone or polymer-based coatings, is applied to less severe secondary impact region 78. Additionally, proper strategic placement of primary low ice adhesion surface coating 80 and secondary low ice adhesion surface coating 82 is more cost-effective and improves maintenance.

While primary impact regions and secondary impact regions have been described in reference to external components of air data probes, internal components of air data probes, such as pitot probes and total air temperature probes, may also define primary impact regions and secondary impact regions suitable for strategic placement of primary low ice adhesion surface coatings and secondary low ice adhesion surface coatings, respectively.

DISCUSSION OF POSSIBLE EMBODIMENTS

The following are non-exclusive descriptions of possible embodiments of the present invention.

An air data probe includes a body; a mount adjacent to the body; a primary low ice adhesion surface coating on a primary impact region of the air data probe, the primary impact region being positioned for direct impact with water drops; and a secondary low ice adhesion surface coating on a secondary impact region of the air data probe, the secondary impact region being positioned for indirect contact by water drops; wherein the primary low ice adhesion surface coating has a different composition than the secondary low ice adhesion surface coating.

The air data probe of the preceding paragraph can optionally include, additionally and/or alternatively, any one or more of the following features, configurations and/or additional components:

The primary low ice adhesion surface coating comprises slippery liquid infused porous surfaces.

The secondary low ice adhesion surface coating is selected from a group consisting of a hydrophobic coating, a super-hydrophobic coating, a silicone-based coating, and a polymer-based coating.

The primary impact region is a forward portion of the air data probe.

The secondary impact region is an aft portion of the air data probe.

The air data probe is a pitot probe; the body comprises: a probe head; and a strut connected to the probe head; the mount comprises a mounting flange connected to the strut; and the primary impact region is the probe head.

The secondary impact region is an aft portion of the strut.

The primary low ice adhesion surface coating comprises slippery liquid infused porous surfaces; and wherein the secondary low ice adhesion surface coating is selected from a group consisting of a hydrophobic coating, a super-hydrophobic coating, a silicone-based coating, and a polymer-based coating.

The air data probe is a total air temperature probe; the body comprises: a head having an inlet scoop; and a strut connected to the head; the mount comprises a mounting flange connected to the strut; and the primary impact region is the inlet scoop.

The primary impact region is the inlet scoop and a forward portion of the strut.

The secondary impact region is an aft portion of the strut.

The primary low ice adhesion surface coating comprises slippery liquid infused porous surfaces; and wherein the secondary low ice adhesion surface coating is selected from a group consisting of a hydrophobic coating, a super-hydrophobic coating, a silicone-based coating, and a polymer-based coating.

The air data probe is an angle of attack sensor; the body comprises a vane; the mount comprises a faceplate, the faceplate being positioned on a housing; and the primary impact region is the vane.

The secondary impact region is an exterior surface of the faceplate.

The primary low ice adhesion surface coating comprises slippery liquid infused porous surfaces; and wherein the secondary low ice adhesion surface coating is selected from a group consisting of a hydrophobic coating, a super-hydrophobic coating, a silicone-based coating, and a polymer-based coating.

The mount is connectable to an aircraft.

The primary low ice adhesion surface coating is configured to prevent ice from forming in the primary impact region.

The primary low ice adhesion surface coating is configured to decrease the amount of heat required to prevent ice from forming in the primary impact region.

The secondary low ice adhesion surface coating is configured to decrease the amount of ice that forms in the secondary impact region.

The secondary low ice adhesion surface coating is configured to prevent significant ice accumulation in the secondary impact region without the use of heat.

A method of avoiding undesirable ice buildup on an air data probe includes shedding ice and/or water from a primary impact region of the air data probe with a primary low ice adhesion surface coating; and shedding ice and/or water from a secondary impact region of the air data probe with a secondary low ice adhesion surface coating.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An air data probe comprising:
a body;
a mount adjacent to the body;

a primary low ice adhesion surface coating on a primary impact region of the air data probe, the primary impact region being positioned for direct impact with water drops; and a secondary low ice adhesion surface coating on a secondary impact region of the air data probe, the secondary impact region being positioned for indirect contact by water drops;

wherein the primary low ice adhesion surface coating has a different composition than the secondary low ice adhesion surface coating.

2. The air data probe of claim 1, wherein the primary low ice adhesion surface coating comprises slippery liquid infused porous surfaces.

3. The air data probe of claim 1, wherein the secondary low ice adhesion surface coating is selected from a group consisting of a hydrophobic coating, a super-hydrophobic coating, a silicone-based coating, and a polymer-based coating.

4. The air data probe of claim 1, wherein the primary impact region is a forward portion of the air data probe.

5. The air data probe of claim 1, wherein the secondary impact region is an aft portion of the air data probe.

6. The air data probe of claim 1, wherein:
the air data probe is a pitot probe;
the body comprises:
  a probe head; and
  a strut connected to the probe head;
the mount comprises a mounting flange connected to the strut; and
the primary impact region is the probe head.

7. The air data probe of claim 6, wherein the secondary impact region is an aft portion of the strut.

8. The air data probe of claim 6, wherein the primary low ice adhesion surface coating comprises slippery liquid infused porous surfaces; and wherein the secondary low ice adhesion surface coating is selected from a group consisting of a hydrophobic coating, a super-hydrophobic coating, a silicone-based coating, and a polymer-based coating.

9. The air data probe of claim 1, wherein:
the air data probe is a total air temperature probe;
the body comprises:
  a head having an inlet scoop; and
  a strut connected to the head;
the mount comprises a mounting flange connected to the strut; and
the primary impact region is the inlet scoop.

10. The air data probe of claim 9, wherein the primary impact region is the inlet scoop and a forward portion of the strut.

11. The air data probe of claim 9, wherein the secondary impact region is an aft portion of the strut.

12. The air data probe of claim 9, wherein the primary low ice adhesion surface coating comprises slippery liquid infused porous surfaces; and wherein the secondary low ice adhesion surface coating is selected from a group consisting of a hydrophobic coating, a super-hydrophobic coating, a silicone-based coating, and a polymer-based coating.

13. The air data probe of claim 1, wherein:
the air data probe is an angle of attack sensor;
the body comprises a vane;
the mount comprises a faceplate, the faceplate being positioned on a housing; and
the primary impact region is the vane.

14. The air data probe of claim 13, wherein the secondary impact region is an exterior surface of the faceplate.

15. The air data probe of claim 13, wherein the primary low ice adhesion surface coating comprises slippery liquid infused porous surfaces; and wherein the secondary low ice adhesion surface coating is selected from a group consisting of a hydrophobic coating, a super-hydrophobic coating, a silicone-based coating, and a polymer-based coating.

16. The air data probe of claim 1, wherein the primary low ice adhesion surface coating is configured to prevent ice from forming in the primary impact region.

17. The air data probe of claim 1, wherein the primary low ice adhesion surface coating is configured to decrease the amount of heat required to prevent ice from forming in the primary impact region.

18. The air data probe of claim 1, wherein the secondary low ice adhesion surface coating is configured to decrease the amount of ice that forms in the secondary impact region.

19. The air data probe of claim 1, wherein the secondary low ice adhesion surface coating is configured to prevent significant ice accumulation in the secondary impact region without the use of heat.

20. A method of avoiding undesirable ice buildup on an air data probe, the method comprising:
shedding ice and/or water from a primary impact region of the air data probe with a primary low ice adhesion surface coating; and
shedding ice and/or water from a secondary impact region of the air data probe with a secondary low ice adhesion surface coating.

\* \* \* \* \*